(12) United States Patent
Perkins et al.

(10) Patent No.: US 9,580,062 B2
(45) Date of Patent: Feb. 28, 2017

(54) METHOD FOR INCREASING FUEL ECONOMY OF PLUG-IN HYBRID ELECTRIC VEHICLES

(75) Inventors: William Paul Perkins, Dearborn, MI (US); Ming Lang Kuang, Canton, MI (US); Shunsuke Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 919 days.

(21) Appl. No.: 13/346,841

(22) Filed: Jan. 10, 2012

(65) Prior Publication Data

US 2012/0116626 A1 May 10, 2012

(51) Int. Cl.
*B60W 10/26* (2006.01)
*B60W 10/06* (2006.01)
*B60W 10/08* (2006.01)
*B60W 50/00* (2006.01)

(52) U.S. Cl.
CPC ............ *B60W 10/26* (2013.01); *B60W 10/06* (2013.01); *B60W 10/08* (2013.01); *B60W 20/11* (2016.01); *B60W 50/0097* (2013.01); *B60W 2510/244* (2013.01); *B60W 2550/402* (2013.01); *B60W 2710/0677* (2013.01); *Y02T 10/6269* (2013.01); *Y02T 10/6291* (2013.01); *Y02T 90/14* (2013.01)

(58) Field of Classification Search
USPC .............. 701/22; 180/65.21, 65.265, 65.275, 180/65.28, 65.285, 65.29
See application file for complete search history.

(56) References Cited

U.S. PATENT DOCUMENTS

| | | | |
|---|---|---|---|
| 5,495,912 A * | 3/1996 | Gray et al. ..................... | 180/165 |
| 6,500,089 B2 * | 12/2002 | Lasson ................... | B60K 6/445 477/3 |
| 6,705,416 B1 | 3/2004 | Glonner et al. | |
| 7,114,585 B2 * | 10/2006 | Man ....................... | B60K 6/365 180/65.21 |
| 7,434,641 B2 * | 10/2008 | Takami .................. | B60K 6/365 180/65.25 |
| 7,540,344 B2 * | 6/2009 | Yamamoto ............... | B60K 6/44 180/65.28 |

(Continued)

FOREIGN PATENT DOCUMENTS

| | | |
|---|---|---|
| CN | 1200824 C | 5/2005 |
| CN | 1895944 A | 1/2007 |

(Continued)

OTHER PUBLICATIONS

Chinese Patent Office, First Chinese Office Action for the corresponding Chinese Patent Application No. 2013100063824 dated May 5, 2016.

*Primary Examiner* — Nicholas Kiswanto
(74) *Attorney, Agent, or Firm* — David B. Kelley; Brooks Kushman P.C.

(57) ABSTRACT

A method for increasing fuel economy of a vehicle such as a plug-in hybrid electric vehicle (PHEV) having an engine and a battery each configured to supply power to propel the vehicle includes supplying power from the battery and operating the engine below peak efficiency to supply from the engine only the difference in power between a demanded power and the power which the battery can deliver when the demanded power exceeds the power which the battery can deliver.

17 Claims, 4 Drawing Sheets

(56) References Cited

U.S. PATENT DOCUMENTS

| | | | |
|---|---|---|---|
| 7,583,052 B2* | 9/2009 | Yoshii | B60K 6/26 320/104 |
| 7,641,583 B2* | 1/2010 | Houle | B60K 6/387 180/65.21 |
| 7,753,150 B2 | 7/2010 | Tamor | |
| 7,766,107 B2* | 8/2010 | Joe | B60K 6/48 180/65.21 |
| 7,766,108 B2* | 8/2010 | Rimaux | B60K 6/48 180/65.265 |
| 7,771,310 B2* | 8/2010 | Tanishima | B60K 6/387 180/65.21 |
| 7,806,210 B2* | 10/2010 | Proietty | B60K 6/48 180/170 |
| 7,857,082 B2* | 12/2010 | Gray, Jr. | B60K 5/08 180/65.28 |
| 8,001,906 B2* | 8/2011 | King | B60L 3/0046 105/35 |
| 8,016,061 B2* | 9/2011 | Jeon | B60L 3/0046 180/65.22 |
| 8,307,924 B2 | 11/2012 | Wang et al. | |
| 2005/0139400 A1 | 6/2005 | Gee | |
| 2006/0250902 A1 | 11/2006 | Bender et al. | |
| 2008/0110683 A1* | 5/2008 | Serkh | B60K 25/00 180/54.1 |
| 2008/0276825 A1* | 11/2008 | King | B60L 3/0046 105/50 |
| 2010/0218916 A1* | 9/2010 | Miller | F01P 7/165 165/104.11 |
| 2010/0280687 A1* | 11/2010 | Tate, Jr. | B60W 10/06 701/22 |
| 2011/0120788 A1 | 5/2011 | Wang et al. | |
| 2011/0190968 A1* | 8/2011 | Fleming | G06F 19/00 701/22 |
| 2011/0288710 A1* | 11/2011 | Ito et al. | 701/22 |
| 2012/0046814 A1* | 2/2012 | Sugimoto | B60K 6/445 701/22 |

FOREIGN PATENT DOCUMENTS

| | | |
|---|---|---|
| CN | 101209667 A | 7/2008 |
| CN | 101218119 A | 7/2008 |
| CN | 101659204 A | 3/2010 |

* cited by examiner

METHOD FOR INCREASING FUEL ECONOMY OF PLUG-IN HYBRID ELECTRIC VEHICLES

TECHNICAL FIELD

The present disclosure relates to path-dependent control of plug-in hybrid electric vehicles.

BACKGROUND

A plug-in hybrid electric vehicle (PHEV) includes two power sources for delivering power to propel the vehicle. Typically, the first power source is an engine that consumes fuel to deliver power, and the second power source is a battery that uses stored electric energy to deliver power. The battery may be rechargeable from an on-board generator driven by the engine and/or an external electric power source, such as the electric utility grid.

Many consumers expect a PHEV to use electric energy whenever possible to minimize use of fuel due to the relatively lower-cost of grid supplied electric energy. As such, a PHEV may have two basic operating modes: a charge depleting (CD) mode; and a charge sustaining (CS) mode. In the CD mode, electric energy from the battery is used to propel the vehicle and depletes the stored electric energy as reflected in the associated battery state-of-charge (SOC). A vehicle system controller or the like controls the vehicle to prioritize power delivered by the battery, with engine power used to supplement battery power when needed to meet driver requirements. Once the battery SOC decreases to a predefined charge level, the vehicle is driven in the CS mode and primarily powered by the engine.

The CD mode includes an electric vehicle (EV) mode (i.e., an all-electric mode), a blended mode, and an engine mode. In the EV mode, only electric energy and no fuel energy is used to propel the PHEV. As recognized by the present disclosure, a typical PHEV is designed for limited EV mode operation (e.g., 25 kW). If the driver demands more power (e.g., 30 kW) than the EV system of the vehicle can deliver (i.e., 25 kW), then control transitions to the blended mode and the engine is started to meet the driver-demanded power. However, the engine of a typical PHEV is calibrated to operate near its peak efficiency (e.g., 20 kW), which often produces more power than needed to supplement the battery power and meet the driver demand (i.e., 30 kW−25 kW=5 kW in this example). Consequently, the vehicle not only consumes fuel during this period, but the vehicle consumes more fuel (i.e., 20 kW/$\eta$, where $\eta$=combustion efficiency) than needed to meet the driver-demanded power (i.e., 5 kW/$\eta$) with the excess engine power used to recharge the battery.

The CD range of a PHEV is the distance the vehicle can travel in the CD mode before switching to the CS mode. The CD range at a given time depends on the current battery SOC. The driver typically does not care about fuel efficiency in terms of fuel consumption per unit of power produced when the driver intends to drive a distance less than the CD range of the vehicle. Rather, when the distance to be driven is less than the CD range of the vehicle, the driver is generally more concerned about fuel economy (i.e., miles/gallon). Any relatively small increase in fuel consumption can drastically reduce fuel economy such as from 500 mi/gal to 60 mi/gal thereby disappointing the driver.

SUMMARY

Embodiments of the present invention are directed to controlling a plug-in hybrid electric vehicle (PHEV) to increase the fuel economy of the vehicle.

A PHEV in accordance with embodiments of the present invention includes an engine and a battery for delivering power to propel the vehicle. The engine consumes fuel and the battery stores and uses electric energy. The battery is rechargeable from an electric grid. The PHEV is controlled to use electric energy instead of fuel energy as much as possible between charging events. To this end, the PHEV is driven in the charge-depleting (CD) mode while the battery has a stored amount of electric energy greater than a predetermined minimum amount of electric energy. In the CD mode, use of electric energy for vehicle propulsion is prioritized. Upon the battery being depleted to a minimum amount of stored electric energy, the PHEV is driven in the charge-sustaining (CS) mode until the next charging event with the vehicle being mainly powered by the engine with fuel.

Maximum fuel economy for the PHEV is desired as electrical grid power for the battery costs less than fuel for the engine. By primarily using electric energy to propel the vehicle, the fuel consumption is decreased and hence the fuel economy is increased. The fuel economy for a given trip can be maximized if the battery is completely depleted (e.g., the battery SOC is depleted to the predetermined minimum charge-sustaining level) before the engine is started during the trip.

Accordingly, embodiments of the present invention are directed to controlling a PHEV to minimize fuel consumption of the vehicle and thereby increase the fuel economy of the vehicle even though this may not maximize fuel efficiency (compared to fuel economy). Certain embodiments of the present invention are directed to controlling a PHEV to minimize the fuel consumption regardless of how far the vehicle is intended to be driven. Certain embodiments of the present invention are directed to controlling a PHEV to minimize the fuel consumption when the distance to be driven by the vehicle is less than the CD range of the vehicle. Control strategies in accordance with embodiments of the present invention are applicable during a vehicle trip with certain of the control strategies being applicable when the distance to be driven by the PHEV for the trip (i.e., the distance to destination (D2D)) is less than the CD range of the vehicle.

An embodiment of the present invention provides a method which includes supplying power from a battery of a vehicle such as a PHEV. The method further includes operating an engine of the vehicle below peak efficiency to supply from the engine only the difference in power between a demanded power and the power which the battery can deliver when the demanded power exceeds the power which the battery can deliver.

Another embodiment of the present invention provides a method which includes enabling at a given time one of a fuel economy mode and a fuel efficiency mode for a vehicle such as a PHEV having an engine and a battery each configured to supply power to propel the vehicle. The fuel economy mode includes supplying power from the battery and operating the engine below peak efficiency to supply from the engine only the difference in power between a demanded power and the power which the battery can deliver when the demanded power exceeds the power which the battery can deliver.

Another embodiment of the present invention provides a system having a controller configured to carry out the operation of the methods noted above.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
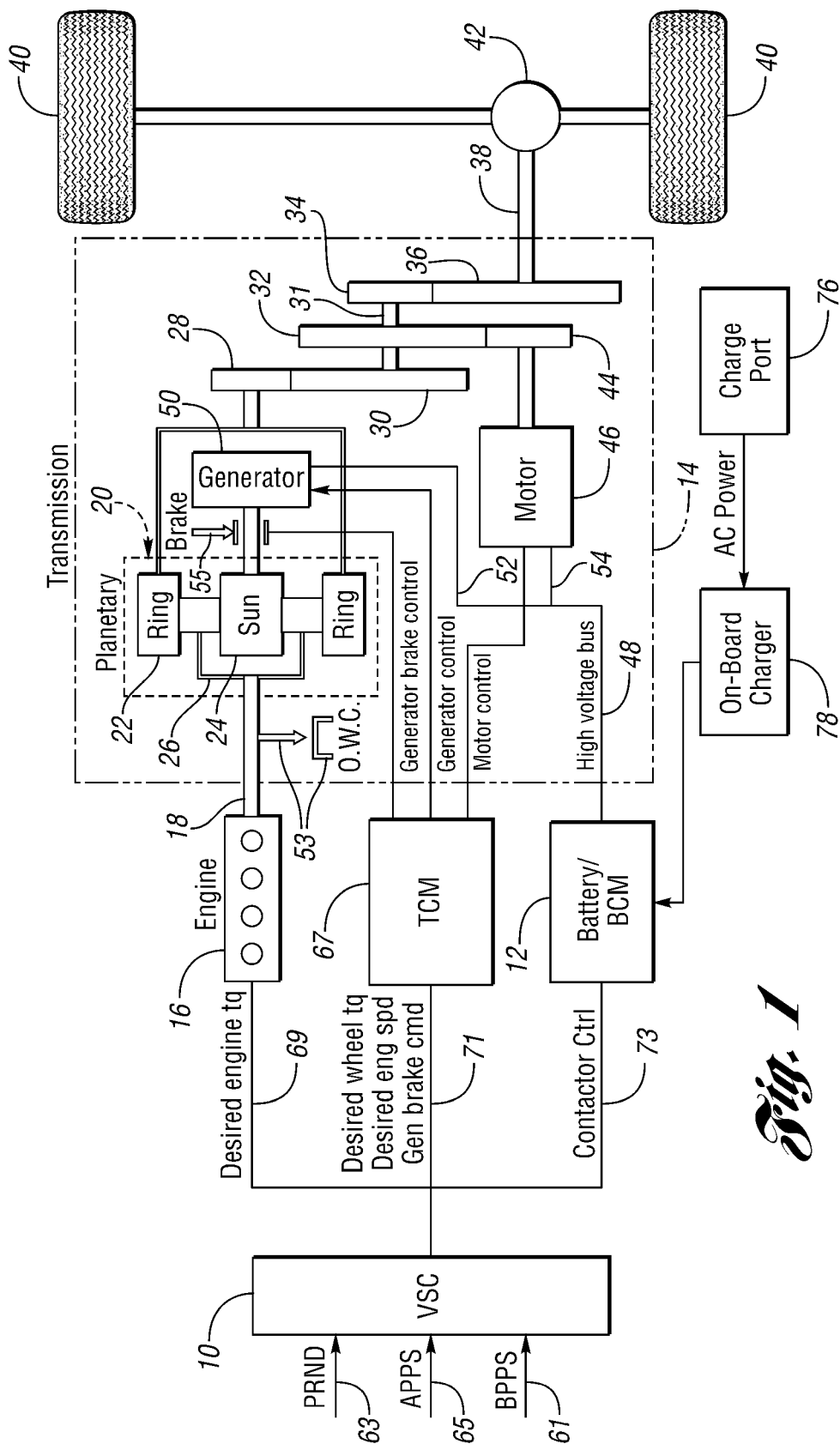
FIG. 1 illustrates a schematic representation of a plug-in hybrid electric vehicle (PHEV) powertrain capable of embodying the present invention.

Referring now to FIG. 1, a schematic representation of a plug-in hybrid electric vehicle (PHEV) powertrain capable of embodying the present invention is shown. The powertrain includes two power sources that are connected to the driveline: (1) an engine 16 and a generator 50 connected together via a planetary gear arrangement 20; and (2) an electric drive system including a battery 12, an electric motor 46, and generator 50. Battery 12 is an energy storage system for motor 46 and generator 50.

Battery 12 is rechargeable from a power source residing external the vehicle (e.g., an external electric grid). Battery 12 receives AC electrical energy from the grid via a charge port 76 connected to the grid during a charging event. An on-board charger 78 receives the AC electrical energy from charge port 76. Charger 78 is an AC/DC converter which converts the received AC electrical energy into DC electrical energy suitable for charging battery 12. Charger 78 supplies the DC electrical energy to battery 12 in order to charge battery 12 during the recharging operation (i.e., a charging event).

A vehicle system controller (VSC) 10 is configured to send control signals to and receive sensory feedback information from one or more of battery 12, engine 16, motor 46, and generator 50 in order for power to be provided to vehicle traction wheels 40 for propelling the vehicle. Controller 10 controls the power source proportioning between battery 12 and engine 16 for providing power to propel the vehicle and thereby controls the state of charge (SOC) of battery 12.

Transmission 14 includes planetary arrangement 20, which includes a ring gear 22, a sun gear 24, and a carrier assembly 26. Ring gear 22 distributes torque to step ratio gears comprising meshing gear elements 28, 30, 32, 34, and 36. A torque output shaft 38 of transmission 14 is driveably connected to wheels 40 through a differential-and-axle mechanism 42. Gears 30, 32, and 34 are mounted on a counter shaft 31 with gear 32 engaging a motor-driven gear 44. Motor 46 drives gear 44. Gear 44 acts as a torque input for counter shaft 31. Engine 16 distributes torque through input shaft 18 to transmission 14. Battery 12 delivers electric power to motor 46 through power flow path 48. Generator 50 is connected electrically to battery 12 and to motor 46, as shown at 52.

While battery 12 is acting as a sole power source with engine 16 off, input shaft 18 and carrier assembly 26 are braked by an overrunning coupling (i.e., one-way clutch (OWC)) 53. A mechanical brake 55 anchors the rotor of generator 50 and sun gear 24 when engine 16 is on and the powertrain is in a parallel drive mode, sun gear 24 acting as a reaction element.

Controller 10 receives a signal PRND (park, reverse, neutral, drive) from a transmission range selector 63, which is distributed to transmission control module (TCM) 67, together with a desired wheel torque, a desired engine speed, and a generator brake command, as shown at 71. A battery switch 73 is closed after vehicle "key-on" startup. Controller 10 issues a desired engine torque request to engine 16, as shown at 69, which is dependent on accelerator pedal position sensor (APPS) output 65. A brake pedal position sensor (BPPS) distributes a wheel brake signal to controller 10, as shown at 61. A brake system control module (not shown) may issue to controller 10 a regenerative braking command based on information from the BPPS. TCM 67 issues a generator brake control signal to generator brake 55. TCM 67 also distributes a generator control signal to generator 50.

Figure 2:
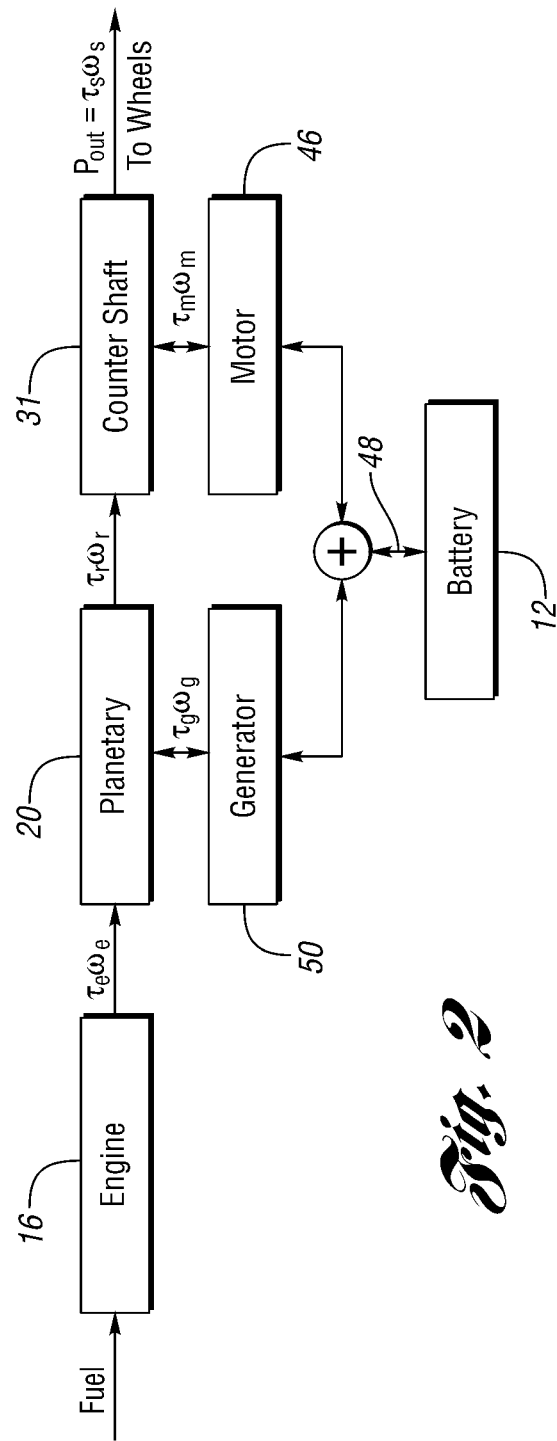
FIG. 2 illustrates a block diagram of power flow in the powertrain shown in FIG. 1.

Referring now to FIG. 2, a block diagram of power flow paths between the various components of the powertrain of FIG. 1 is shown. Fuel is delivered to engine 16 under the control of the driver using an engine throttle. Engine 16 delivers engine power ($\tau_e \omega_e$, where $\tau_e$ is engine torque and $\omega_e$ is engine speed) to planetary arrangement 20. Planetary 20 delivers power ($\tau_r \omega_r$, where $\tau_r$ is the ring gear torque and $\omega_r$ is the ring gear speed) to counter shaft 31. Output shaft 38 outputs power ($P_{out} = \tau_s \omega_s$, where $\tau_s$ and $\omega_s$ are the torque and speed of output shaft 38, respectively) to wheels 40. Generator 50 can deliver power to or be driven by planetary 20. Similarly, power distribution between motor 46 and counter shaft 31 can be distributed in either direction. Driving power from battery 12 or charging power to battery 12 is represented by the bi-directional arrow 48.

The engine output power ($\tau_e \omega_e$) can be split into a mechanical power flow path ($\tau_r \omega_r$) and an electrical power flow path ($\tau_g \omega_g$ to $\tau_m \omega_m$, where $\tau_g$ is the generator torque, $\omega_g$ is the generator speed, $\tau_m$ is the motor torque, and $\omega_m$ is the motor speed). In this so-called positive split mode of operation, engine 16 delivers power to planetary 20 which delivers power ($\tau_r \omega_r$) to counter shaft 31 which in turn drives wheels 40. A portion of the planetary gearing power ($\tau_g \omega_g$) is distributed to generator 50, which delivers charging power to battery 12. Battery 12 drives motor 46, which distributes power ($\tau_m \omega_m$) to counter shaft 31.

If generator brake 55 is activated, a parallel operating mode is established. In the parallel operating configuration, engine 16 is on and generator 50 is braked. Battery 12 powers motor 46, which powers counter shaft 31 simultaneously with delivery of power from engine 16 to planetary 20 to counter shaft 31. During operation with the second power source (described as including battery 12, motor 46, and generator 50), motor 46 draws power from battery 12 and provides propulsion independently from engine 16 to the drivetrain.

As described, the PHEV has two power sources for delivering driving power to wheels 40. The first power source includes engine 16 and the second power source includes battery 12. Engine 16 and battery 12 can provide traction power either simultaneously or independently. Controller 10 controls the electric energy and fuel energy proportioning to meet the propulsion requirements and thereby controls engine 16 and battery 12 accordingly.

In accordance with embodiments of the present invention, controller 10 controls engine 16 and battery 12 in such a way as to increase the fuel economy of the PHEV. In particular, controller 10 modifies the engine operating strategy in order to maximize the fuel economy of the PHEV. In certain embodiments of the present invention, controller 10 controls engine 16 and battery 12 to increase the fuel economy of the PHEV when the distance to be driven by the vehicle (i.e., the distance to destination (D2D)) is less than the CD range of the vehicle. As such, in these latter embodiments, controller 10 is made aware of and compares the D2D and the CD range. Controller 10 modifies the engine operating strategy accordingly when the D2D is less than the CD range. Controller 10 may learn the D2D before the trip begins by, for example, the driver inputting a D2D value or by receiving related data provided by a navigation system of the PHEV. Controller 10 may learn the CD range based on the SOC of battery 12.

In operation, for example, if the CD range is 20 miles and the D2D is 15 miles before the next charging event, then controller 10 operates engine 16 to supply only the additional power needed during transient events. For instance, if the driver demands 30 kW of propulsion power and the electric drive system of the PHEV can only deliver 25 kW of power, then controller 10 starts engine 16 to supply only 5 kW of power instead of controlling engine 16 to operate near its peak efficiency. In the case of engine 16 operating near its peak efficiency, engine 16 would supply, for instance, 20 kW of power. As such, although engine 16 is less efficient when supplying only 5 kW of power instead of supplying 20 kW of power, engine 16 consumes less fuel. That is, in this example, engine 16 consumes less fuel when supplying 5 kW of power than when supplying 20 kW of power even though engine 16 is less efficient when supplying 5 kW of power than when supplying 20 kW of power.

If the transient event lasts five seconds, then 5 kW of engine output power is 25 kJ of energy and 20 kW of engine output power is 100 kJ of energy. Assume that engine 16 is 8% efficient at the 5 kW engine output power and is 14% efficient at the 20 kW engine output power and that the gasoline volumetric energy is 132 MJ/gal. Engine 16 consumes 0.002 gallons of fuel when operating at the 5 kW output power during the transient event whereas engine 16 consumes 0.006 gallons of fuel when operating at the 20 kW output power during the transient event. Accordingly, engine 16 consumes three times less fuel when operating with less efficiency and outputting only 5 kW of power than when operating near its peak efficiency and outputting 20 kW of power. As such, the PHEV has better fuel economy even though the PHEV has worse fuel efficiency when engine 16 is outputting only 5 kW of power and operating with less efficiency.

Assume that there are ten of these transient events on this 15 mile trip. The fuel economy of operating engine 16 at only the minimum required 5 kW output with lower engine efficiency is 750 miles per gallon. The fuel economy of operating engine 16 at the 20 kW output with peak engine efficiency is 250 miles per gallon. Both results are appreciable. However, the 750 mi/gal result is relatively much higher than the 250 mi/gal result even though there is only a small difference (0.06 gallons) in actual fuel consumption on this 15 mile trip.

Figure 3:
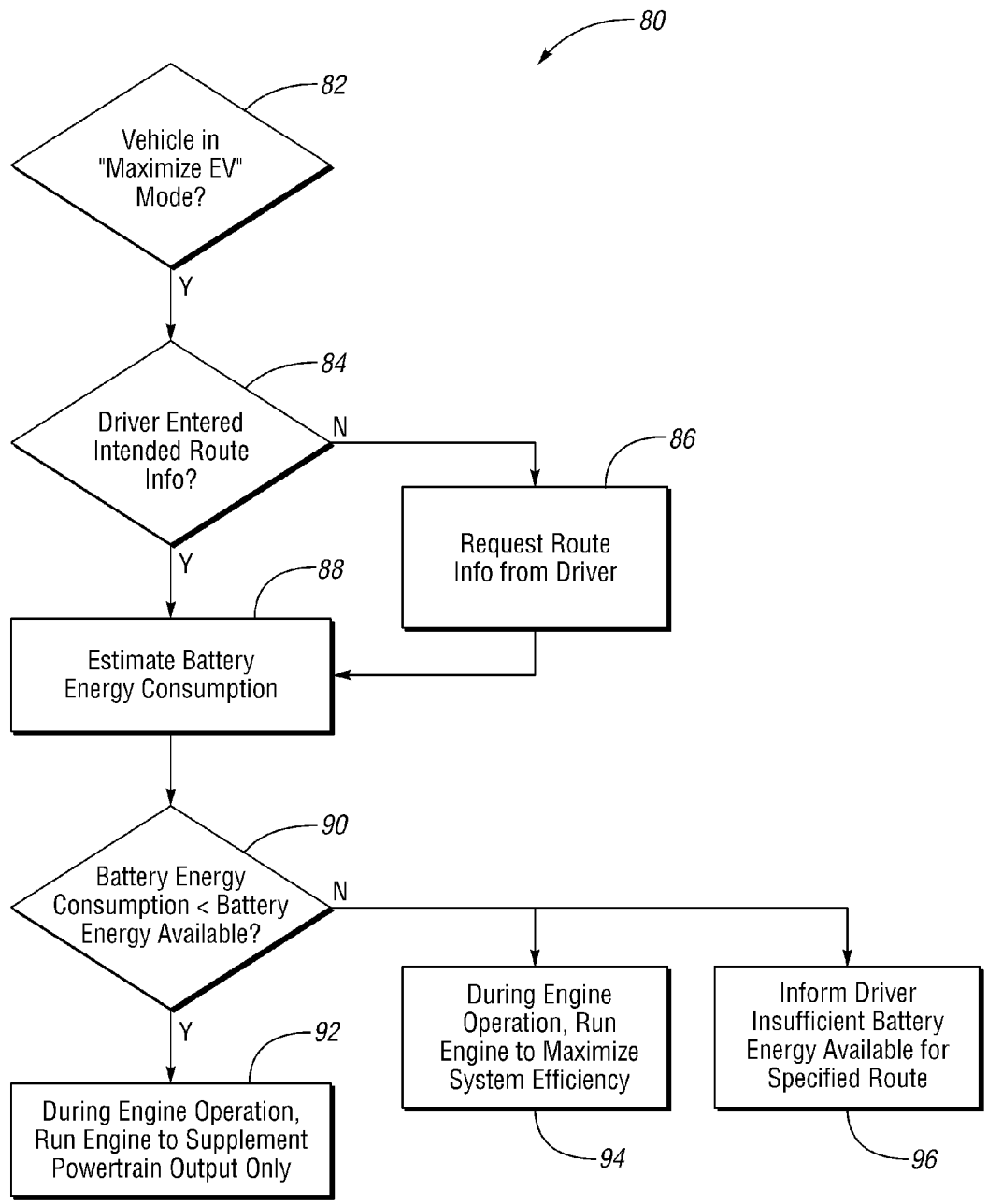
FIG. 3 illustrates a flowchart describing operation of a method for increasing the fuel economy of a PHEV in accordance with an embodiment of the present invention.

Referring now to FIG. 3, a flowchart 80 describing operation of a method for controlling the PHEV in such a way as to increase the fuel economy of the vehicle in accordance with an embodiment of the present invention is shown. The operation processes are implemented by, for example, controller 10 of the PHEV.

The operation begins at the beginning of an upcoming trip of the PHEV. Controller 10 sets engine 16 and battery 12 to be in the all-electric mode (i.e., the EV mode) at the beginning of the trip as indicated in block 82. In the EV mode, only the electric drive system including battery 12 is configured to provide power to propel the PHEV. Engine 16 is not configured to provide power to propel the PHEV in the EV mode. Thus, in the pure EV mode, there is no fuel consumption while the PHEV is driven.

Before the trip begins, controller 10 learns of the distance that the PHEV is intended to be driven for the trip (i.e., controller 10 learns the D2D value). For instance, the driver inputs the D2D value for receipt by controller 10 as indicated in block 84. If the driver does not enter the D2D value within some time period, then controller 10 may inquire the driver for such information as indicated in block 86. Further, controller 10 may automatically receive related data indicative of the D2D value from a navigation system of the PHEV.

After obtaining the D2D value, controller 10 calculates how much electric energy from battery 12 would be needed to propel the PHEV entirely in the EV mode for the entire distance of the trip as indicated in block 88. That is, controller 10 calculates how much electric energy from battery 12, with no fuel energy from engine 16, would be used to propel the PHEV for the entire D2D. The calculated electric energy is referred to as the 'estimated battery energy consumption' in block 88.

With reference to block 90, controller 10 obtains the SOC value of battery 12 and calculates therefrom the amount of electric energy stored in battery 12 that is available for being used to propel the PHEV. All of the electric energy stored in battery 12 at a given time is not available for being used to propel the PHEV as battery 12 is to have at least a predetermined minimum amount of electric energy at any given time (i.e., battery 12 is to have at least the predetermined minimum charge-sustaining SOC level). The electric energy stored in battery 12 available for propelling the PHEV is referred to as the 'battery energy available' in block 90.

In block 90, controller 10 compares the estimated battery energy consumption of the trip (obtained in block 88) with the battery energy available for the trip. If the available battery energy is greater than the estimated battery energy consumption, then controller 10 operates engine 16 and battery 12 in a fuel economy mode during the trip to thereby increase the fuel economy of the PHEV. That is, if battery 12 has enough electric power stored therein to propel the PHEV in the EV mode by itself for the entire trip, then controller 10 enables the fuel economy mode during the trip. The operation in the fuel economy mode is described in detail below with reference to block 92.

On the other hand, if the available battery energy is less than the estimated battery energy consumption, then controller 10 operates engine 16 and battery 12 in a fuel efficiency mode during the trip. That is, if battery 12 does not have enough electric power stored therein to propel the PHEV in the EV mode by itself for the entire trip, then controller 10 enables the fuel efficiency mode during the trip. The operation in the fuel efficiency mode is described in detail below with reference to blocks 94 and 96.

Put another way, in block 90, controller 10 is essentially comparing the D2D (which is the basis for the estimated battery energy consumption of the trip) and the CD range (which is the basis for the battery energy available for the trip). If the D2D is less than (or equal to) the CD range, then controller 10 enables the fuel economy mode (block 92) during the trip. On the other hand, if the D2D is greater than the CD range, then controller 10 enables the fuel efficiency mode (blocks 94 and 96) during the trip.

Figure 4:
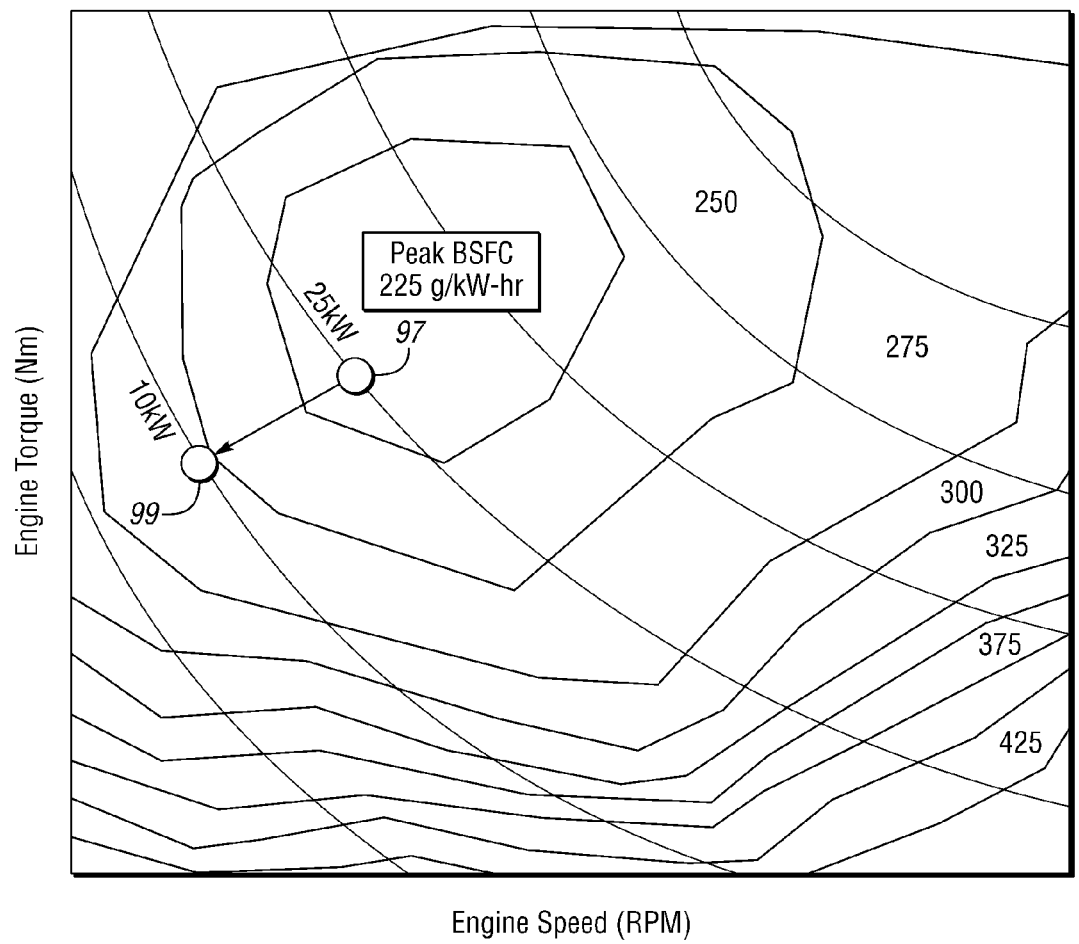
FIG. 4 illustrates an engine torque-speed map with brake specific fuel consumption (BSFC) for describing aspects of the operation of the method for increasing the fuel economy of a PHEV in accordance with an embodiment of the present invention.

Operation in the fuel efficiency mode during the trip (i.e., when the D2D is greater than the CD range) with reference to blocks 94 and 96 will be initially described. In the fuel efficiency mode, controller 10 controls engine 16 and battery 12 such that the powertrain uses only the stored electric energy of battery 12 when the driver-demanded power is less than the battery limits. If the driver requests more power, then controller 10 starts engine 16 to meet the increased driver-demanded power. However, controller 10 runs engine 16 in such a way that optimizes fuel energy efficiency as indicated in block 94. For example, if the driver-demanded power exceeds the battery capability by 10 kW, then, for the given operational conditions, engine 16 will be started and operated at 25 kW because the fuel consumption to power-production ratio is better at 25 kW (see point 97 in the map illustrated of FIG. 4). That is, engine 16 is operated at its peak efficiency in which engine 16 supplies 25 kW of engine output power. As such, engine 16 supplies 25 kW of output power even though only 10 kW of additional output power is needed to satisfy the increased driver-demanded power. Of the 25 kW of engine output power, 10 kW is delivered to wheels 40 to thereby satisfy the increased driver-demanded power and the remaining 15 kW is used to charge battery 12 (via generator 50) instead of being conveyed to wheels 40. That is, the additional 10 kW from engine 16 is delivered to wheels 40 and the remaining 15 kW from engine 16 is used to charge battery 12 for later usage.

When controller 10 enables the fuel efficiency mode after learning that the D2D is greater than the CD range, controller 10 may inform the driver via a display or the like that the fuel efficiency mode (and not the fuel economy mode) is enabled as indicated in block 96.

Operation in the fuel economy mode during the trip (i.e., when the D2D is less than the CD range) with reference to block 92 will now be described. The example scenario discussed above for the fuel efficiency mode will be used again. In the fuel economy mode, bias is given to use electrical energy from battery 12 to save fuel. When the driver-demanded power exceeds the capability of battery 12, then controller 10 starts and operates engine 16 to supply only 10 kW of engine output power (see point 99 in the map illustrated in FIG. 4). That is, controller 10 controls engine 16 to supply only the additional power required (10 kW) to meet the increased driver-demanded power. As such, controller 10 does not operate engine 16 near its peak efficiency in which engine 16 supplies 25 kW of engine output power as in the fuel efficiency mode. Even though the fuel energy usage is less efficient (i.e., less fuel efficiency), the overall fuel usage is reduced (i.e., increased fuel economy). The grid-supplied electricity used to charge battery 12 may be one third of the cost of the fuel (per unit energy) so using less fuel via the fuel economy mode saves costs and results in higher miles/gallon fuel consumption ratio.

As described with reference to FIG. 3, control strategies in accordance with certain embodiments of the present invention operate in the fuel economy mode of block 92 when the D2D is less than the CD range. However, as noted above, in other embodiments of the present invention, operation of the fuel economy mode can occur regardless of any D2D and CD range considerations. That is, operation in the fuel economy mode pursuant to block 92 of FIG. 3 is not dependent on any D2D information entered by the driver or the navigation system. Rather, operation in the fuel economy mode can occur in response to the driver selecting this mode by, for instance, actuating a toggle switch or an HMI input to indicate same. In summary, in other embodiments of the present invention, the D2D is not required or used by controller 10. Instead, controller 10 simply operates the powertrain in the fuel economy mode in order to maximize the fuel economy without knowing how far the driver intends to drive.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method comprising:
   operating an engine of a vehicle below peak efficiency while the engine is capable of operating at peak efficiency to output from the engine, while a battery of the vehicle is supplying power in response to a demanded power, only the difference in power between (i) the demanded power and (ii) the power which the battery can deliver, when the demanded power exceeds the power which the battery can deliver.

2. The method of claim 1 further comprising:
   supplying from the battery the power which the battery can deliver.

3. The method of claim 1 wherein:
   operating the engine to output the difference in power when the demanded power exceeds the power which the battery can deliver is enabled while the battery has sufficient energy by itself to propel the vehicle over a distance to be driven by the vehicle.

4. The method of claim 1 further comprising:
   receiving a request from a driver of the vehicle to enable the engine to output the difference in power when the demanded power exceeds the power which the battery can deliver;
   wherein operating the engine to output the difference in power is disabled until receiving the request.

5. The method of claim 1 further comprising:
   supplying from the battery the demanded power when the demanded power is less than the power which the battery can deliver.

6. The method of claim 1 further comprising:
   increasing the power supplied from the battery to the power which the battery can deliver and increasing the power outputted by the engine to supply more than the difference in power when the demanded power exceeds the power which the battery can deliver and when the battery lacks sufficient energy by itself to propel the vehicle over a distance to be driven by the vehicle.

7. The method of claim 1 wherein:
   the vehicle is a plug-in hybrid electric vehicle.

8. A method comprising:
   enabling at a given time one of a fuel economy mode and a fuel efficiency mode for a vehicle having an engine and a battery each configured to supply power to propel the vehicle;
   wherein the fuel economy mode includes supplying power from the battery in response to a demanded power, and wherein the fuel economy mode further includes operating the engine below peak efficiency of the engine while the engine is capable of operating at peak efficiency of the engine to output from the engine, while the battery is supplying power in response to the demanded power, only the difference in power between (i) the demanded power and (ii) the power which the battery can deliver, when the demanded power exceeds the power which the battery can deliver.

9. The method of claim 8 further comprising:
obtaining a distance to be driven by the vehicle; and
disabling the fuel economy mode until a charge-depletion range of the vehicle exceeds the distance to be driven, wherein the charge-depletion range is the distance that the vehicle can be driven with energy from the battery itself.

10. The method of claim 9 wherein:
the distance to be driven is obtained from at least one of a driver of the vehicle and a navigation system of the vehicle.

11. The method of claim 8 further comprising:
receiving a request from a driver of the vehicle to enable the fuel economy mode; and
disabling the fuel economy mode until receiving the request from the driver.

12. The method of claim 8 wherein:
the fuel economy mode further includes supplying from the battery the demanded power when the demanded power is less than the power which the battery can deliver.

13. The method of claim 8 wherein:
the fuel economy mode is enabled while the battery has sufficient energy by itself to propel the vehicle over a distance to be driven by the vehicle.

14. A system comprising:
a controller configured to enable at a given time one of a fuel economy mode and a fuel efficiency mode for a vehicle having an engine and a battery each configured to supply power to propel the vehicle;
wherein in the fuel economy mode the controller is configured to control the battery to supply power in response to a demanded power, and wherein in the fuel economy mode the controller is further configured to operate the engine below peak efficiency of the engine while the engine is capable of operating at peak efficiency of the engine to output from the engine, while the battery is supplying power in response to the demanded power, only the difference in power between (i) the demanded power and (ii) the power which the battery can deliver, when the demanded power exceeds the power which the battery can deliver.

15. The system of claim 14 wherein:
the controller is further configured to obtain a distance to be driven by the vehicle; and
wherein the controller is further configured to disable the fuel economy mode until a charge-depletion range of the vehicle exceeds the distance to be driven, wherein the charge-depletion range is the distance that the vehicle can be driven with energy from the battery itself.

16. The system of claim 14 wherein:
the controller disables the fuel economy mode while the battery lacks sufficient energy by itself to propel the vehicle over a distance to be driven by the vehicle.

17. The system of claim 14 wherein:
the vehicle is a plug-in hybrid electric vehicle.

* * * * *